United States Patent
Graffagnino et al.

(10) Patent No.: US 10,602,410 B2
(45) Date of Patent: *Mar. 24, 2020

(54) NETWORK BACKHAUL ACCESS

(71) Applicant: Oceus Networks Inc., Reston, VA (US)

(72) Inventors: Vincent Charles Graffagnino, Rockwall, TX (US); John Green, Wylie, TX (US)

(73) Assignee: Oceus Networks Inc., Reston, VA (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/889,729

(22) Filed: Feb. 6, 2018

(65) Prior Publication Data
US 2018/0249391 A1    Aug. 30, 2018

Related U.S. Application Data

(63) Continuation of application No. 15/204,810, filed on Jul. 7, 2016, now Pat. No. 9,924,427.

(51) Int. Cl.
*H04W 36/08* (2009.01)
*H04W 24/02* (2009.01)
(Continued)

(52) U.S. Cl.
CPC ........... *H04W 36/08* (2013.01); *H04W 24/02* (2013.01); *H04W 24/08* (2013.01); *H04W 76/36* (2018.02);
(Continued)

(58) Field of Classification Search
CPC ..... H04W 36/08; H04W 76/36; H04W 24/08; H04W 24/02; H04W 36/14; H04W 84/18
See application file for complete search history.

(56) References Cited

U.S. PATENT DOCUMENTS 5,309,503 A   5/1994  Bruckert et al.
5,768,501 A   6/1998  Lewis
(Continued)

FOREIGN PATENT DOCUMENTS

EP    1401229 A1    3/2004
EP    1553734 A1    7/2005
(Continued)

OTHER PUBLICATIONS

"Digital cellular telecommunications system (Phase 2+); Universal Mobile Telecommunications System (UMTS); L TE; Interworking between the Public Land Mobile Network (PLMN) supporting packet based services and Packet Data Networks (PDN)" Technical Specification, European Telecommunication Standards Institute (ETSI), France, vol. 36PP CT3, No. V11.4.0, Apr. 1, 2013.
(Continued)

*Primary Examiner* — Christine Ng
(74) *Attorney, Agent, or Firm* — Knobbe, Martens, Olson & Bear, LLP

(57) ABSTRACT

A communication system can provide an independent mobile cellular network to devices within a covered area. In addition, the system can determine whether user equipment within a covered area of the communication system are to have backhaul access to another communication system and/or whether to adjust the point of presence of the user equipment.

19 Claims, 4 Drawing Sheets

(51) Int. Cl.
  *H04W 24/08* (2009.01)
  *H04W 76/36* (2018.01)
  *H04W 84/18* (2009.01)
  *H04W 88/08* (2009.01)
  *H04W 36/14* (2009.01)

(52) U.S. Cl.
  CPC ............ *H04W 36/14* (2013.01); *H04W 84/18* (2013.01); *H04W 88/085* (2013.01)

(56) References Cited

U.S. PATENT DOCUMENTS

| | | | |
|---|---|---|---|
| 6,842,462 | B1 | 1/2005 | Ramjee et al. |
| 6,965,816 | B2 | 11/2005 | Walker |
| 7,072,657 | B2 | 7/2006 | Watanabe et al. |
| 7,317,717 | B2 | 1/2008 | Pankajakshan et al. |
| 7,486,967 | B2 | 2/2009 | Pan et al. |
| 7,535,861 | B2 | 5/2009 | Buchholz et al. |
| 7,539,158 | B2 | 5/2009 | Pan |
| 7,548,763 | B2 | 6/2009 | Pan |
| 7,567,822 | B2 | 7/2009 | Hart et al. |
| 7,573,713 | B2 | 8/2009 | Hoffman et al. |
| 7,653,414 | B2 | 1/2010 | Pan |
| 7,684,801 | B2 | 3/2010 | Suzuki et al. |
| 7,805,372 | B2 | 9/2010 | Weiss |
| 7,817,589 | B2 | 10/2010 | Hoffman et al. |
| 7,840,230 | B2 | 11/2010 | Pan |
| 7,855,988 | B2 | 12/2010 | Pan |
| 7,856,233 | B2 | 12/2010 | Pan |
| 7,979,066 | B2 | 7/2011 | Pan |
| 8,036,158 | B2 | 10/2011 | Pan et al. |
| 8,046,420 | B2 | 10/2011 | Pan |
| 8,089,920 | B2 | 1/2012 | Pan |
| 8,107,409 | B2 | 1/2012 | Pan |
| 8,140,077 | B2 | 3/2012 | Saifullah et al. |
| 8,224,322 | B2 | 7/2012 | Pan |
| 8,270,325 | B2 | 9/2012 | Hoffman et al. |
| 8,310,990 | B2 | 11/2012 | Pan |
| 8,326,286 | B2 | 12/2012 | Pan |
| 8,340,667 | B2 | 12/2012 | Pan |
| 8,359,029 | B2 | 1/2013 | Pan |
| 8,374,124 | B2 | 2/2013 | Abusch-Magder et al. |
| 8,503,336 | B2 | 8/2013 | Rappaport et al. |
| 8,626,210 | B2 | 1/2014 | Hicks, III |
| 8,654,749 | B2 | 2/2014 | Buchholz et al. |
| 8,676,197 | B2 | 3/2014 | Pan et al. |
| 8,688,111 | B2 | 4/2014 | Pan |
| 8,706,105 | B2 | 4/2014 | Pan |
| 8,744,435 | B2 | 6/2014 | Pan |
| 8,780,804 | B2 | 7/2014 | Pan |
| 8,811,992 | B2 | 8/2014 | Hoole |
| 8,824,969 | B2 | 9/2014 | Nakamori et al. |
| 9,055,163 | B1 | 6/2015 | Row, II et al. |
| 9,167,442 | B2 | 10/2015 | Uelk et al. |
| 9,198,221 | B2 | 11/2015 | Schemagin et al. |
| 9,226,192 | B2 | 12/2015 | Graffagnino et al. |
| 9,264,241 | B2 | 2/2016 | Balar et al. |
| 9,338,093 | B2 | 5/2016 | Eichen et al. |
| 9,444,801 | B2 | 9/2016 | Luo et al. |
| 9,445,280 | B2 | 9/2016 | Uelk et al. |
| 9,451,646 | B2 | 9/2016 | Schemagin et al. |
| 9,686,238 | B1 | 6/2017 | Row, II |
| 9,742,729 | B2 | 8/2017 | Graffagnino et al. |
| 9,769,674 | B2 | 9/2017 | Uelk et al. |
| 9,912,640 | B2 | 3/2018 | Row, II |
| 9,924,427 | B2 * | 3/2018 | Graffagnino ........... H04W 76/36 |
| 10,021,619 | B2 | 7/2018 | Schemagin et al. |
| 10,172,078 | B2 | 1/2019 | Graffagnino et al. |
| 10,244,405 | B2 | 3/2019 | Uelk et al. |
| 10,382,393 | B2 | 8/2019 | Graffagnino et al. |
| 2001/0013107 | A1 | 8/2001 | Lewis |
| 2004/0259555 | A1 | 12/2004 | Rappaport et al. |
| 2006/0015745 | A1 | 1/2006 | Sukigara et al. |
| 2006/0098661 | A1 | 5/2006 | Pan |
| 2006/0178153 | A1 | 8/2006 | Tenny et al. |
| 2006/0192651 | A1 | 8/2006 | Lee |
| 2006/0234747 | A1 | 10/2006 | Pan et al. |
| 2006/0234774 | A1 | 10/2006 | Pan et al. |
| 2007/0049267 | A1 | 3/2007 | Kota et al. |
| 2007/0202847 | A1 | 8/2007 | Pan et al. |
| 2007/0232267 | A1 | 10/2007 | Pan et al. |
| 2007/0253359 | A1 * | 11/2007 | Hall ........ H04W 76/12 370/328 |
| 2007/0264930 | A1 | 11/2007 | Daoudal |
| 2007/0287452 | A1 | 12/2007 | Pan et al. |
| 2008/0005380 | A1 | 1/2008 | Kawasaki et al. |
| 2008/0039144 | A1 | 2/2008 | Pan et al. |
| 2008/0095070 | A1 | 4/2008 | Chan et al. |
| 2008/0108378 | A1 | 5/2008 | Gessner et al. |
| 2008/0146158 | A1 | 6/2008 | Pan et al. |
| 2008/0181188 | A1 | 7/2008 | Aghvami et al. |
| 2008/0268830 | A1 | 10/2008 | Sharma et al. |
| 2008/0285492 | A1 | 11/2008 | Vesterinen |
| 2009/0201878 | A1 | 8/2009 | Kotecha et al. |
| 2009/0205023 | A1 | 8/2009 | Pan et al. |
| 2009/0227235 | A1 | 9/2009 | Pan et al. |
| 2009/0232019 | A1 * | 9/2009 | Gupta ............ H04L 12/287 370/252 |
| 2009/0271491 | A1 | 10/2009 | Pan et al. |
| 2009/0280853 | A1 | 11/2009 | Brisebois et al. |
| 2009/0325584 | A1 | 12/2009 | Pan et al. |
| 2009/0327819 | A1 | 12/2009 | Pan et al. |
| 2010/0008306 | A1 | 1/2010 | Pan et al. |
| 2010/0008369 | A1 | 1/2010 | Pan |
| 2010/0027448 | A1 | 2/2010 | Puthiyandyil et al. |
| 2010/0075668 | A1 | 3/2010 | Pan et al. |
| 2010/0105373 | A1 | 4/2010 | Kanade |
| 2010/0190470 | A1 | 7/2010 | Raleigh |
| 2010/0197268 | A1 | 8/2010 | Raleigh |
| 2010/0202455 | A1 | 8/2010 | Sundaram et al. |
| 2010/0260157 | A1 | 10/2010 | Buchholz et al. |
| 2011/0059740 | A1 | 3/2011 | Pan et al. |
| 2011/0060853 | A1 | 3/2011 | Pan et al. |
| 2011/0122824 | A1 | 5/2011 | Muhanna et al. |
| 2011/0130135 | A1 | 6/2011 | Trigui |
| 2011/0176536 | A1 | 7/2011 | De Franca Lima et al. |
| 2011/0195743 | A1 | 8/2011 | Jee et al. |
| 2011/0202589 | A1 | 8/2011 | Piernot et al. |
| 2011/0223921 | A1 | 9/2011 | Pan et al. |
| 2011/0263253 | A1 | 10/2011 | Zhao et al. |
| 2011/0275364 | A1 | 11/2011 | Austin et al. |
| 2011/0300866 | A1 | 12/2011 | Ali et al. |
| 2012/0002607 | A1 | 1/2012 | Pan et al. |
| 2012/0051321 | A1 | 3/2012 | De et al. |
| 2012/0057568 | A1 | 3/2012 | Lim et al. |
| 2012/0094659 | A1 | 4/2012 | Pan et al. |
| 2012/0106454 | A1 | 5/2012 | Pan et al. |
| 2012/0147874 | A1 | 6/2012 | Kotecha |
| 2012/0224474 | A1 | 9/2012 | Beser |
| 2012/0224566 | A1 | 9/2012 | O'Leary |
| 2012/0252444 | A1 | 10/2012 | Pan et al. |
| 2012/0269167 | A1 * | 10/2012 | Velev ............ H04W 36/0011 370/331 |
| 2012/0276866 | A1 | 11/2012 | Sennett et al. |
| 2013/0003697 | A1 * | 1/2013 | Adjakple ......... H04W 36/0011 370/331 |
| 2013/0028097 | A1 | 1/2013 | Barrett |
| 2013/0029708 | A1 | 1/2013 | Fox et al. |
| 2013/0039279 | A1 | 2/2013 | Pan et al. |
| 2013/0065583 | A1 | 3/2013 | Pan et al. |
| 2013/0130677 | A1 | 5/2013 | Pan et al. |
| 2013/0148578 | A1 | 6/2013 | Pan et al. |
| 2014/0154967 | A1 | 6/2014 | Pan et al. |
| 2014/0173388 | A1 | 6/2014 | Pan et al. |
| 2014/0315553 | A1 | 10/2014 | Hoole |
| 2015/0181492 | A1 | 6/2015 | Schmidt et al. |
| 2015/0319774 | A1 * | 11/2015 | Cai ........ H04W 72/14 370/329 |
| 2015/0358959 | A1 * | 12/2015 | Meshkati ......... H04W 72/0413 370/329 |
| 2016/0365882 | A1 | 12/2016 | Kim et al. |
| 2017/0238229 | A1 | 8/2017 | Schemagin et al. |
| 2018/0013724 | A1 | 1/2018 | Row, II |
| 2018/0014340 | A1 | 1/2018 | Hill et al. |

(56) References Cited

U.S. PATENT DOCUMENTS

| | | | |
|---|---|---|---|
| 2018/0034771 A1 | 2/2018 | Graffagnino et al. |
| 2018/0176793 A1 | 6/2018 | Uelk et al. |
| 2018/0192264 A1 | 7/2018 | Kwok et al. |
| 2018/0234386 A1 | 8/2018 | Row, II |
| 2018/0376398 A1 | 12/2018 | Schemagin et al. |
| 2019/0053145 A1 | 2/2019 | Ieshiro et al. |
| 2019/0182758 A1 | 6/2019 | Graffagnino et al. |
| 2019/0289471 A1 | 9/2019 | Uelk et al. |

FOREIGN PATENT DOCUMENTS

| | | | |
|---|---|---|---|
| EP | 2031920 A1 | 3/2009 |
| GB | 2452796 | 3/2009 |
| WO | WO 2007/044880 | 4/2007 |
| WO | WO 2009/100736 A1 | 8/2009 |
| WO | WO 2009/127965 A1 | 10/2009 |
| WO | WO 2014/031597 | 2/2014 |
| WO | WO 2014/031689 A1 | 2/2014 |
| WO | WO 2014/179235 | 11/2014 |

OTHER PUBLICATIONS

Kaul, et al.: "On the adpatation of commercial smartphones to tactical environments", Military Communications Conference, 2011, Nov. 7, 2011, pp. 2205-2210.

Nystromer, "Quiclink: A Portable 3G WCDMA Cellular Service, Deployed in Minutes" Presentation, Jun. 11, 2007, pp. 1-27.

Press Release: Harris Corporation Introduces Tactical 3G Cellular Network-in-a-Box for Warfighters, Published Apr. 19, 2011, http://harris.com/view_ pressrelease.asp?pr_id=3230.

Press Release: Tecore Unveils the Mobile Industry's First 3G-4G Network in a Box (NIB), Published Feb. 14, 2011, http://www.tecore.com/newsevents/release.cfm?newsID=164.

Tecore Networks, The Mobile Industry's First All-In-One Network Solution Supporting WCDMA, HSPA+ and L TE, first release Feb. 14, 2011, http://www.tecore.com/solutions/TecoreNetworks-Datasheet-2G-3G-4G-NetworkI nABox.pdf.

International Search Report and Written Opinion dated Feb. 11, 2014, International Application No. PCT/US2013/055864.

International Search Report and Written Opinion dated Nov. 8, 2013, International Application No. PCT/US2013/055721.

International Search Report and Written Opinion dated Sep. 26, 2014, International Application No. PCT/US2014/035732.

"Digital cellular telecommunications system (Phase 2+)(GSM); Universal Mobile Telecommunications System (UMTS); LTE; Non-Access-Stratum (NAS) functions related to Mobile Station (MS) in idle mode (3GPP TS 23.122 version 13.4.0 Release 13)", May 2016, 52 pages.

* cited by examiner

NETWORK BACKHAUL ACCESS

INCORPORATION BY REFERENCE TO ANY PRIORITY APPLICATIONS

This present application is a continuation of U.S. patent application Ser. No. 15/204,810, filed Jul. 7, 2016, entitled "NETWORK BACKHAUL ACCESS," which is incorporated herein by reference in its entirety. Any and all applications for which a foreign or domestic priority claim is identified in the Application Data Sheet as filed with the present application are incorporated by reference under 37 CFR 1.57 and made a part of this specification.

BACKGROUND

A cellular network typically include multiple stationary antennas, base stations, or the like, in different locations that communicate with a mobile telephone switching office (MTSO) and/or one or more core network components (generally referred to as the core or core network) that are remotely located from the different base stations. The MTSO or mobile core determines how calls are routed between the base stations and enables the base stations to communicate with each other for handover purposes. If a base station cannot communicate (e.g., via a backhaul) with the MTSO or mobile core, or the rest of the network, all communications at that base station are lost and user equipment (UE) in corresponding network areas cannot communicate with other UE, even if the UE trying to communicate with each other are in the same network area. In addition, the base stations are built to be stationary so that UE within a particular geographic area always have network access.

When a user moves from one network to another network, the mobile cores of the two networks communicate with each other to handle the handover and other configuration details (non-limiting example: a core network component of the first cellular network communicates with a core network component of the second cellular network). In addition to communicating for handover purposes, core network components from different cellular networks may also communicate in order to route data (non-limiting examples: voice data, video data, application data, control data, etc.) from a user in a first cellular network to another user in a second cellular network.

Many locations throughout the world lack a network infrastructure that would enable users to communicate via a typical telephone or cellular network. In such locations it can be difficult for users to communicate effectively. Users must often rely on technologies that are more expensive, have lower bandwidth, or have limited use distances, such as satellite phones, half-duplex radio transceivers, etc. Furthermore, these locations often lack the resources to create the network infrastructure necessary for a cellular network, such as cell towers, base stations (or the like), switching stations, etc. In some circumstances, such as war zones, etc., building the network infrastructure for such communications is not feasible due to the transient nature of military personnel and equipment.

SUMMARY

One device that can be used to improve communications in such environments is a mobile cellular network (MCN) communication system, also referred to as a network-in-a-box (NIB). The NIB can include all of the components of a typical cellular network, but residing in one location (non-limiting examples: co-located, in the same room, container, rack, area, vehicle, etc.). Further, the NIB does not need to communicate with other nodes, base stations (or the like), or an MTSO to provide complete cellular network functionality to endpoints (non-limiting examples: UE, servers, etc.) within a covered area. In addition, as the NIB moves, the network coverage moves with it. The UE can include, but are not limited to, cell phones, smart phones, tablets, computers, laptops, tracking devices, targeting devices, weapons systems, and/or any electronic device configured to communicate with one or more MCN communication systems. Thus, NIBs can create a cellular network within a limited area that allows user equipment (or other endpoints) within that area to communicate with each other. One example of a commercially available NIB, or MCN communication system, is the Xiphos™ available from Oceus Networks.

Furthermore, in some embodiments, where multiple MCN communication systems provide multiple mobile cellular networks, they can communicate with each other for handovers and data routing, etc.

DETAILED DESCRIPTION

Figure 1:
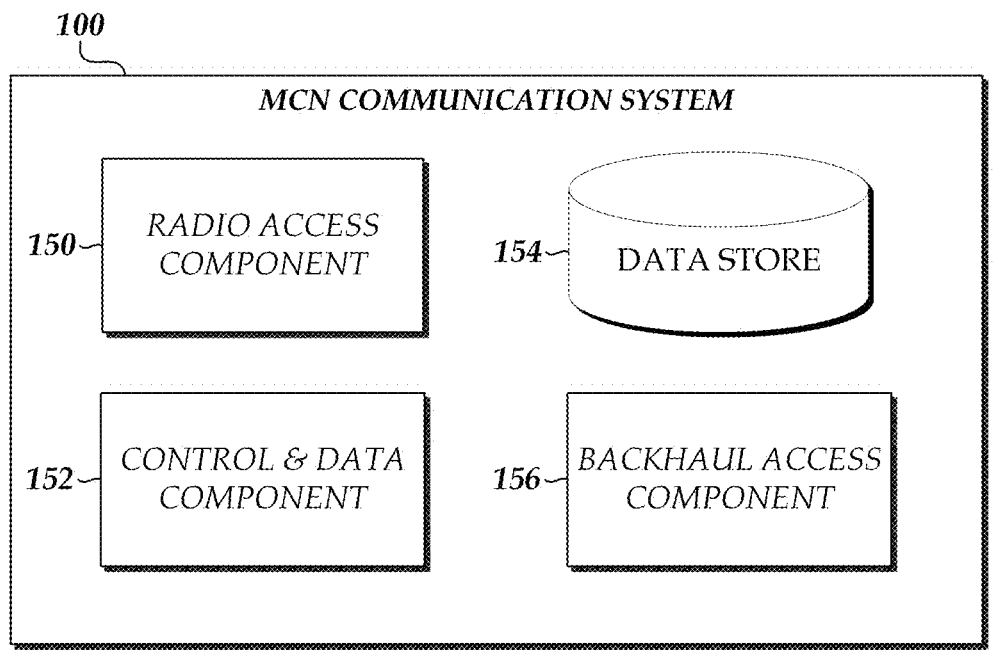
FIG. 1 is a block diagram of an embodiment of a MCN communication system.

One or more MCN communication systems can be deployed in areas where cellular networks are not available. As mentioned previously, each MCN communication system can independently provide a portable, self-contained cellular network for devices in respective coverage areas.

In some cases, multiple MCN communication systems can be networked together to create a network of MCN communication systems, also referred to herein as a NOM, as described in greater detail in U.S. application Ser. Nos. 13/972,112 and 14/264,297, entitled Mobile Cellular Networks and Mobile Cellular Network Backhaul, respectively, each of which is incorporated by reference herein in its entirety. The different MCN communication systems within the NOM or between NOMs, can communicate with each other via a backhaul using a variety of communication technologies, including satellite communication, microwave or radio wave communication, OFDM, WiMAX, LTE, etc., as described in greater detail in U.S. application Ser. Nos. 13/972,112 and 14/264,297, incorporated herein by reference, and, in some cases, NOMs can communicate with each other. As further described in U.S. application Ser. Nos. 13/972,112 and 14/264,297, incorporated herein by reference, when networked together, some MCN communication systems can be configured as master devices or hosts and other MCN communication systems can be configured as secondary devices, clients and/or relays.

In some cases, a UE can communicate with one MCN communication system (which can be referred to herein as the local MCN communication system), but can have a point of presence associated with another MCN communication system (referred to herein as the remote MCN communication system). The point of presence of the UE can be an IP address associated with (non-limiting example: assigned by) the remote MCN communication system, such as a specific access node or gateway of the remote MCN communication system, a DNS identifier associated with the remote MCN communication system, an access point name (APN) of the remote MCN communication system, access point identifier, a port identifier (e.g., D-CSCF port), a max allocated rate for data transmission, such as uplink (UL) and/or downlink (DL), etc. The remote MCN communication system may be the MCN communication system associated with the coverage area from which the UE just moved from or it may be some other MCN communication system.

By retaining the point of presence associated with the remote MCN communication system, the UE can continue to access applications, servers available via the remote MCN communication system (in some cases uniquely available via the remote MCN communication system). In addition, by retaining the point of presence with the remote MCN communication system, existing data streams can be maintained without a break in communication, and communications to and from the UE can be routed between the local MCN communication system and the remote MCN communication system via the backhaul.

In some embodiments, a backhaul access component associated with the local MCN communication system can use backhaul access criteria to determine whether to provide a backhaul link for the UE to the remote MCN communication system. In certain instances, to preserve, or reduce the use of, the backhaul, the backhaul access component system can provide the UE with a local point of presence. In some embodiments, by providing the UE with a local point of presence, the backhaul access component can reduce or eliminate the amount of UE-related traffic sent over the backhaul to the remote MCN communication system. In addition, by providing the UE with a local point of presence the backhaul access component can disallow and/or prevent all backhaul communications and/or backhaul communications with the remote MCN communication system.

In some cases, the local MCN communication can assign a local point of presence to some types of communications or data, while permitting the UE to use the remote point of presence for other types of data. For example, the local MCN communication can assign a local point of presence for data intensive communications, such as, but not limited to, streaming video, file transfer etc., while permitting the UE to retain the remote point of presence for less data intensive communications, such as, but not limited to, voice and text data, email data, Internet data, etc. However, it will be understood that the local MCN communication system can assign a local point of presence or permit the use of the remote point of presence as desired. By selectively assigning a local point of presence based on the type of communications or data, the local MCN communication system can control the amount of UE-related traffic sent over the backhaul. In addition, the local MCN communication system can monitor the backhaul to selectively assign the local point of presence to the different types of data. If the backhaul satisfies the backhaul criteria, the local MCN communication system can permit the UE (or certain types of data from the UE) to use the remote point of presence. If the backhaul does not satisfy the backhaul criteria, the local MCN communication system can assign a local point of presence to the UE (or certain types of data from the UE).

MCN Communication System Overview

FIG. 1 is a block diagram of an embodiment of a MCN communication system 100 and at least some of its components. In the illustrated embodiment, the MCN communication system 100 includes a radio access component 150, which can be used to send/receive wireless communication to/from the MCN communication system, a control and data component 152, a data store 154, and a backhaul access component 156. The MCN communication system 100 can further include and/or can communicate with an antenna, satellite dish, and the like, to receive data from UE or other endpoints, other MCN communication systems, satellites, and the like. In certain embodiments, the MCN communication system 100 can communicate with multiple eNodeBs, base stations, or the like, to increase its coverage area. In addition, as mentioned above, in an IP network architecture, the received/transmitted data can all be in the form of IP data packets.

In some embodiments, each of the components of the MCN communication system 100 can include an identifier, such as an IP address, MAC address, etc. Furthermore, in certain embodiments, the MCN provided by the MCN communication system can include one or more network identifiers, such as access point names, etc. In some embodiments, different types of data can be associated with different access point names. For example, voice-over-IP (VOIP) data can be associated with one APN of the MCN communication system, Internet data can be associated with a different APN of the MCN indication system, etc. Similarly, video data, video data, audio data, file transfer data, text or short message service (SMS) data, multimedia or multimedia message service (MMS) data, etc., can each be assigned to a different APN, or grouped together in any combination on the same APN, as desired. In some cases, the use of different APNs can be based on network policy, such as, but not limited to, treatment of different types of packets or data, treatment of different users. In certain cases, the use of different APNs can be based on billing systems (e.g., the ability to charge for different types of data), carrier grade redundancy (e.g., making data paths for some type of data more resilient than others, such as to make voice data more reliable than Internet data). Packets sent over the network can use the network identifiers of the MCN communication system to identify the MCN communication that is to process the packet and/or that can access a particular destination, etc.

In some embodiments, the MCN communication system can function in an independent mode where communication with other MCN communication systems or a backhaul communication is limited or non-existent. In such embodiments, upon receiving a packet of data, the first MCN communication system can refer to a look-up table stored in a data storage device to determine whether a destination identifier of the packet is within its covered area. If the destination is within the covered area (non-limiting examples: an endpoint within the covered area, a component of the MCN communication system, etc.), the MCN communication system can transmit the data to the destination. The data can include any one or more types of communications, including, but not limited to, user plane data (non-limiting examples: voice data, video data, e-mail, SMS data, picture data, files, requests for information, etc.) or control plane data. If the first MCN communication system determines that the destination is not within its covered, the first MCN communication system can transmit a message to the source that communication with the destination is not available, etc.

The MCN communication system can also function in a networked mode such that communication with a destination is available even if the destination is not located within the MCN communication system's covered area. In some instances, the destination may be accessible via the Internet (non-limiting examples: via satellite or wired communication), microwave communication, LTE backhaul, or other form of backhaul technology, etc.

As will be described in greater detail below, multiple MCN communication systems can be related together. In addition, in certain embodiments, when in the networked mode multiple MCN communication systems can be associated together and/or networked together as described in greater detail in U.S. application Ser. No. 13/972,112, previously incorporated herein by reference in its entirety.

Furthermore, when related together, the MCN communication systems can have different functionality depending on their relationship with the other MCN communication systems. For example, as described in greater in U.S. application Ser. Nos. 13/972,112 and 14/264,297, incorporated herein by reference, when related together, one of the MCN communication systems can be designated as a host MCN communication system or Master Device, while the remaining MCN communication systems can be designated as client MCN communication systems, relay MCN communication systems, and/or Secondary Devices.

Furthermore, when multiple MCN communication systems are networked together, a UE can move from the covered area of a first MCN communication system to the covered area of a second MCN communication system without disrupting the service of the UE. As the UE moves from the first MCN communication system to the second MCN communication system, the first and second MCN communication system can effectuate a handover that updates which MCN communication system is the local MCN for the UE. For example, as part of the handover routine the UE can establish a first cellular communication link with the first MCN communication system and terminate a second cellular communication link with the second MCN communication system. Any MCN communication systems to which the UE is registered (e.g., a registered MCN communication system) can similarly update its routing table and any session identifiers in order to continue providing a communication pathway or link for the UE.

With continued reference to FIG. 1, the control and data component 152 can be implemented using one or more computer processors, FPGAs, microcontrollers, etc., and can perform the various operations of the MCN communication system 100. In an IP network architecture, such as 4G LTE, the control and data component 152 can include a packet data network gateway (PGW), serving gateway (SGW), mobility management entity (MME), and policy and charging rules function (PCRF).

The PGW can provide the IP traffic interface between the UE and external IP networks. Together with the SGW, the PGW can route all IP packets between the UE and the external IP network. The PGW can perform policy enforcement, packet filtering for each UE, charging support, packet screening, quality of service, EPS network support, static policy, IPv4 packet data network (PDN), and network address support. The PGW can also provide support for mobility between 3GPP and non-3GPP technologies such as WiMAX and 3GPP2, etc.

The SGW can route and forward user data packets, and work with the PGW to handle user data between the radio access component and external IP networks. The SGW can route the user data from the UE to the PGW or from the PGW to the UE, and provide support during inter-MCN communication system handovers. For idle state UE, the SGW can terminate the downlink data path and trigger paging when downlink data arrives for the UE. The SGW can also manage and store UE contexts, e.g. parameters of the IP bearer service, network internal routing information.

The MME can be responsible for attaching and detaching a UE from the MCN communication system and authenticating the user (by interacting with the home subscriber server (HSS), described in greater detail below). Furthermore, the MME can be responsible for choosing the SGW and PGW for a UE, and can manage PDN connections. In addition, the MME can be responsible for UE tracking and paging procedures including retransmissions.

The PCRF can provide network control regarding the service data flow detection, gating, quality of service, and flow based charging towards a Policy and Charging Enforcement Function (PCEF) contained in the PGW. The PCRF can contain a database holding dynamic policy and charging rules information for the MCN communication system.

Similarly, the control and data component 152 can perform the attachment and detachment of UE, authentication procedures, gateway selection, managing PDN connections, UE tracking and paging, etc. The control and data component 152 can also handle the user data between the radio access component and an external IP network, packet routing and forwarding, handover functions between MCN communication systems, packet buffering initiation of network triggered service request procedures, quality of service policy enforcement, static policy, subscriber location management, subscriber data, and the like. In addition, the control and data component 152 can perform additional procedures as described in greater detail in U.S. application Ser. No. 13/972,112, previously incorporated herein by reference.

The data store 154 can include data regarding the UE in communication with the MCN communication system 100 and within the coverage area corresponding to the MCN communication system 100, such as UE location, authentication keys, etc. In some embodiments, such as IP network architecture, such as a 4G LTE network, the data store 154 can include a home subscriber server (HSS). In addition, the data store 154 can include information regarding other MCN communication systems that are registered with the MCN communication system 100.

The HSS can include subscription information for all UE (including client MCN communications systems that are registered as UE) associated with the MCN communication system, such as all the UE located within the covered area of a MCN communication system and/or the UE located within the covered area of related or associated MCN communications systems. The HSS can store, for example, authentication parameters, security keys, and subscription information for UE within the MCN of the MCN communication system or associated with the MCN communication system. Furthermore, the HSS can include subscriber location information and be involved with subscriber data handling, authentication procedures, etc.

Similarly, the data store 154 can further include data identifying other related MCN communication systems. In some cases, the data identifying the other related MCN communication systems can be used to communicate with the other MCN communication systems.

The backhaul access component 156, which can also be referred to as an access module, can be implemented using one or more computer processors, FPGAs, microcontrollers, etc., and can perform various operations of the MCN communication system 100. In some embodiments, the backhaul access component 156 can be implemented as part of the control and data component 154 and/or can be implemented separately. In some embodiments, the backhaul access component 156 can be implemented as a device that is separate from, and communicates with, the MCN communication system 100. For example, the backhaul access component 156 can communicate with the MCN communication system 100 via a LAN or a WAN.

In certain embodiments, the backhaul access component 156 can be used to perform the various functions identified herein as being performed by the MCN communication system. For example, backhaul access component 156 can determine whether to provide a backhaul link for the UE to a remote MCN communication system associated with the UE's point of presence and/or provide (and/or cause the MCN communication to provide) the UE with a local point of presence.

As mentioned above, a UE may communicate with a local MCN communication system (non-limiting example: the MCN communication system that provides the coverage area within which the UE is located) using the point of presence (also referred to herein as a remote point of presence) associated with a remote MCN communication system (MCN communication system with which the UE is not communicating directly). The backhaul access component 156 can use various criteria, which can be referred to as backhaul access criteria, to determine whether to provide the UE access to the remote MCN communication system via the backhaul. The backhaul access criteria can include, but are not limited to, one or more connectivity thresholds, priority levels, or identifications of the UE, type of data, amount of data, etc. In some cases, the backhaul access criteria can indicate that no traffic is to be sent over the backhaul, that no traffic is to be sent over the backhaul to a particular MCN communication system, server, or application, that certain types or amount of data can be sent over the backhaul, that certain users can use the backhaul, etc. In some cases, the backhaul access criteria can dynamically determine whether data can be communicated over the backhaul based on any one or any combination of: data type, user identification, backhaul characteristics (availability, bandwidth, jitter, lag, etc.) and so on.

Priority Level

In some embodiments, a priority level can be assigned to a MCN communication system, UE and/or users. The different priority levels can be assigned based on any one or any combination of rank of the user, security clearance of the user or device, geographic location of the MCN communication system, UE, or user, mission, time of day, sensor data, etc. For example, the UE associated with a team leader or squad leader can be assigned a higher priority level than the priority level assigned to a member of the team or squad. Similarly, a higher priority level can be assigned a UE or user with a higher security clearance than UE or user with a lower security clearance.

In some embodiments, the priority level threshold and/or the priority level can change over time based on an event, changing geographic location of the user, device, and/or MCN communication system, time of day, mission, etc. For example, during an emergency, such as a firefight or natural disaster, the backhaul access component 156 (or some device in communication with the backhaul access component 156) can increase the priority level threshold, assign UE associated with users affected by the emergency a higher priority level, and/or assign UE associated with users not affected by the emergency a lower priority level to reduce the amount of traffic over the backhaul. Similarly, during an emergency, the backhaul access component 156 can grant/deny backhaul access to affected/unaffected users based on their identity. As another example, if a different user logs onto the UE, the priority level of the UE can change based on the identity of the new user.

In some embodiments, the priority level can change (or be assigned) based on the proximity of the UE to the MCN communication system, a base, checkpoint, other UE, the number of UE attached to the MCN communication system, etc. For example, the priority level can go down (or up) as a UE gets closer to other UE, the MCN communication system, the base, or a checkpoint. Similarly, the priority level can go up (or down) as a UE gets farther away from a base, from other UE, or from the MCN communication system. Similarly, UE within a particular geographic area can be assigned a higher priority level.

In addition, as the number of UE attached to the MCN communication system goes up, the priority level of each UE can go down (or can go up). In some embodiments, the backhaul access component can assign a subset of UE attached to the MCN communication system to it a higher priority level and the other UE a lower priority level in order to control the amount of data sent over the backhaul. For example, if only ten UE are attached to the MCN communication system, the backhaul access component can provide the same priority level to all UE. However, once thirty UE (or some threshold number) are attached to the MCN communication system, the backhaul access component can assign different priority levels based on the identity or rank of the user of the UE such that only ten users (or some determined quantity) have backhaul access, etc. In some cases, the higher priority levels can be assigned based on an identification, such as a ranking or security clearance, of a particular user, etc.

Similarly, the priority level can change (or be assigned) based on the proximity of the MCN communication system to a base, checkpoint, or other MCN communication systems. In some embodiments, as an MCN communication system moves closer to other MCN communication systems or a base, the priority level of UE associated with the MCN communication system can be decreased or increased, as desired. For example, backhaul access may not be necessary when the MCN communication system is on base or near the base, but become increasingly important the farther away the MCN communication is from the base or other MCN communications systems.

In addition, the priority level can change based on the time of day or a mission. For example, if a mission takes place between 0100 and 0300, the UE associated with users that are part of the mission can be assigned a higher priority level during that timeframe.

In some embodiments, the priority level can increase or decrease based on sensor data received from the UE. For example, if it is detected that a UE has experienced a sudden increase/decrease in acceleration or velocity, perhaps due to an explosion or fall, the priority level for the UE and/or surrounding UE can be increased. In addition, if communication is abruptly lost (e.g., within a threshold amount of time) with a threshold number of UE within a particular area, the priority level of UE within the particular area can be increased.

In certain cases, priority levels can be assigned to different types of data or different applications executing on the UE. For example, data associated with one application (non-limiting example: health monitoring application) can be assigned a higher level of priority than data associated with another application (non-limiting example: battery status application). Similarly, applications that are data intensive (or the data itself), such as video streaming or file transfer can be assigned a lower priority level than applications that are less data intensive, such as voice data, text data, email data, etc. As described in greater detail above, the priority level assigned to the data can change over time. For example, during an emergency, such as a firefight or natural disaster, the priority level threshold can be raised and/or data not relevant to the emergency can be assigned a lower priority level to reduce the amount of traffic over the backhaul. As another example, if a different user logs into the UE, the priority level of the data can change based on the identity of the new user.

The backhaul access component 156 can determine based at least in part on the priority level of any one or any combination of the UE, user, data, and/or MCN communication system whether or not a backhaul link to the remote MCN communication system is to be provided. In some embodiments, the backhaul access component 156 can compare the priority level of the UE, user, data, and/or MCN communication system with a priority level threshold. Based at least in part on a determination that the priority level satisfies the priority level threshold, the backhaul access component 156 can provide a backhaul link to the remote MCN communication system.

In addition, a priority level can be assigned to the remote MCN communication system or particular application and/or server associated with the remote MCN communication system, and access granted based on the priority level of the remote MCN communication system.

Backhaul Connectivity

In some cases, the backhaul access component 156 can monitor the backhaul link between the local MCN communication system and the remote MCN communication system. In some embodiments, the backhaul access component 156 can monitor the various connectivity parameters of the backhaul, such as, but not limited to, bandwidth, the number of dropped packets or error rates, bit rate, throughput, transmission delay, speed, latency, jitter, quality of service, availability, etc. In certain embodiments, to monitor the backhaul link the backhaul access component 156 can send query messages to the remote MCN communication system and analyze the response messages. Additional techniques and parameters can be used to monitor the backhaul link as described in greater detail in U.S. application Ser. No. 14/625,815, incorporated herein by reference in its entirety.

Based on the connectivity parameters, the backhaul access component 156 can determine whether or not to provide the backhaul link to the UE. For example, the backhaul access component 156 can provide the backhaul link for the UE based at least in part on a determination that the monitored backhaul link satisfies one or more connectivity thresholds. The connectivity thresholds can be based at least in part on any one or any combination of the connectivity parameters described herein.

For example, if the available bandwidth of the backhaul link does not satisfy a bandwidth threshold, the backhaul access component 156 can determine that the backhaul does not satisfy the connectivity threshold. The bandwidth threshold can correspond to a bandwidth level that is considered satisfactory for communication purposes.

Similarly, the backhaul access component 156 can determine that the backhaul link does not satisfy the connectivity threshold if any one or any combination of the backhaul speed does not satisfy a speed threshold, error rate of the backhaul link does not satisfy an error rate threshold, the number of packets dropped does not satisfy a packets dropped threshold, bit rate of the backhaul link does not satisfy a bit rate threshold, throughput of the backhaul link does not satisfy a throughput threshold, transmission delay of the backhaul link does not satisfy a transmission delay threshold, quality of service of the backhaul link does not satisfy a quality of service threshold, availability of the backhaul link does not satisfy a availability threshold, latency of the backhaul link does not satisfy a latency threshold, jitter in the backhaul link does not satisfy a jitter threshold, the quality of the backhaul link does not satisfy a quality of link threshold, etc.

In some embodiments, the backhaul access component 156 can use any combination of the above-identified connectivity parameters or other parameters to determine whether the backhaul satisfies a connectivity threshold. Furthermore, in some embodiments, the parameters used can be weighted based on the type of communication, type of data, type of backhaul, etc. For example, if the data to be communicated is video data, position/location data, and/or voice data, the backhaul access component 156 can weight the latency of the backhaul link greater than it would if the data is e-mail data or only use a latency threshold to determine whether the backhaul link satisfies the connectivity threshold. As another non-limiting example, if the data is email data or Internet, data, the backhaul access component 156 can weight the error rate or number of dropped packets of the backhaul link greater than it would if the data is video data or voice data, or only use an error rate threshold to determine whether the backhaul link satisfies the connectivity threshold. As yet another non-limiting example, if the backhaul is an LTE backhaul, the throughput can be weighted more than latency, whereas if the backhaul is a satellite backhaul, the latency can be weighted greater than the throughput. Additional weightings or combinations thereof can be used as desired.

In some embodiments, the connectivity threshold can change over time. For example, during an emergency, such as a firefight or natural disaster, the backhaul access component 156 can raise the connectivity threshold (non-limiting examples: the bandwidth threshold, speed threshold, the jitter threshold, the latency threshold, etc.) to reduce the amount of traffic over the backhaul. Furthermore in some embodiments, the connectivity threshold can be different for different UE or data. For example, the connectivity threshold for a UE or data with a higher priority level can be lower than the connectivity threshold for UE or data with the lower priority level. In this way, the backhaul access component 156 can control the amount of traffic over the backhaul. For example, the backhaul access component, can incrementally adjust the amount of traffic (non-limiting examples: by incrementally adjusting the connectivity threshold, priority level threshold, priority levels of UE or data, and/or other backhaul access criteria, or any combination thereof) until a desired amount of traffic or quality of service is reached.

Local Point of Presence

In the event the backhaul access component 156 determines not to provide a backhaul link to the remote MCN communication system based at least in part on the backhaul access criteria (non-limiting examples: the priority level does not satisfy priority level threshold and/or the connectivity threshold is not satisfied), the backhaul access component 156 can cause the local MCN communication system to provide the UE with a local point of presence associated with the local MCN communication system.

In some embodiments, as part of providing the UE with a local point of presence, the backhaul access component 156 can instruct the UE to change its point of presence. For example, the backhaul access component 156 can instruct the UE to reattach to the network, delete the point of presence associated with the remote MCN communication system, and/or discontinue use of the point of presence associated with the remote MCN communication system.

In response to the signal, the UE can delete the remote point of presence, reattach to the network and/or request a new point of presence, and/or discontinue use of the remote point of presence. Once the backhaul access component 156 signals the UE to adjust the point of presence (or as part of the signaling), the local MCN communication system can provide the UE with a local point of presence. In some embodiments, the local point of presence can replace the remote point of presence and/or be used in place of the remote point of presence. In certain embodiments, the UE can retain both the local point of presence and the remote point of presence.

Furthermore, in some embodiments, to provide the UE with the local point of presence, the backhaul access component 156 can cause the local MCN communication system to provide an IP address from a PGW associated with the local MCN communication system, which can replace or be used instead of an IP address assigned from a PGW associated with the remote MCN communication system. In some embodiments, when the UE requests a new point of presence, it can do so using an APN associated with the remote MCN communication system. The backhaul access component 156 can provide a local point of presence associated with the local MCN communication system regardless of the APN requested by the UE. In this way, the local MCN communication system can provide network access to the UE, while the UE can be made to believe that it has attached to the requested APN.

In some embodiments, once the UE is assigned a local point of presence, it can lose access to applications and servers associated with (and possibly unique to) the remote MCN communication system (including its applications, servers, etc.). For example, the UE can delete the remote point of presence or discontinue its use. In this way, the backhaul access component 156 can reduce or eliminate the amount of UE-related traffic sent over the backhaul to the remote MCN communication system. In some embodiments, the backhaul access component 156 can still allow traffic over the backhaul to other MCN communication systems or other destinations, such as other networks, the Internet, etc.

In addition, in some cases, the backhaul access component 156 can reduce or eliminate the use of the backhaul (to any destination) for UE within its coverage area based at least in part on the backhaul access criteria. However, it will be understood that the MCN communication system can provide communication links between endpoints within its coverage area regardless of the backhaul access such that UE (or other endpoints) within the coverage area can communicate with other UE, services, servers, and/or applications within the coverage area.

In certain embodiments, the UE can retain the remote point of presence, and use the local point of presence for some communications and the remote point of presence for other communications. For example, the UE can use the remote point of presence for applications that are available from, or unique to, the remote MCN communication system and the local point of presence for all other communications. In such embodiments, when the local point of presence is used, the UE can be unable to access the remote MCN communication system (or its applications and servers).

Furthermore, in some cases, the UE can include a local point of presence and multiple remote points of presence. The different points of presence can be used based on the network that the UE is accessing. For example, to access the local MCN communication system, the local point of presence can be used. To access a first or second remote MCN communication system, a first or second remote point of presence can be used, respectively. In this way, the UE can access to different MCN communication systems and corresponding applications, servers, etc.

In some embodiments, the UE may have multiple points of presence assigned for different types of data (non-limiting examples: a point of presence associated with voice data, a point of presence for application data, a point of presence for Internet data, a point of presence for voice-over-IP data, etc.). Accordingly, in certain embodiments, the remote point of presence and the local point of presence referred to above can be for the same type of data. As such, in some embodiments, when the point of presence of the UE is changed from the remote point of presence to the local point of presence, it can be for the same type of data. For example, a remote point of presence for application data can be changed to a local point of presence for application data.

Data Flow

Figure 2:
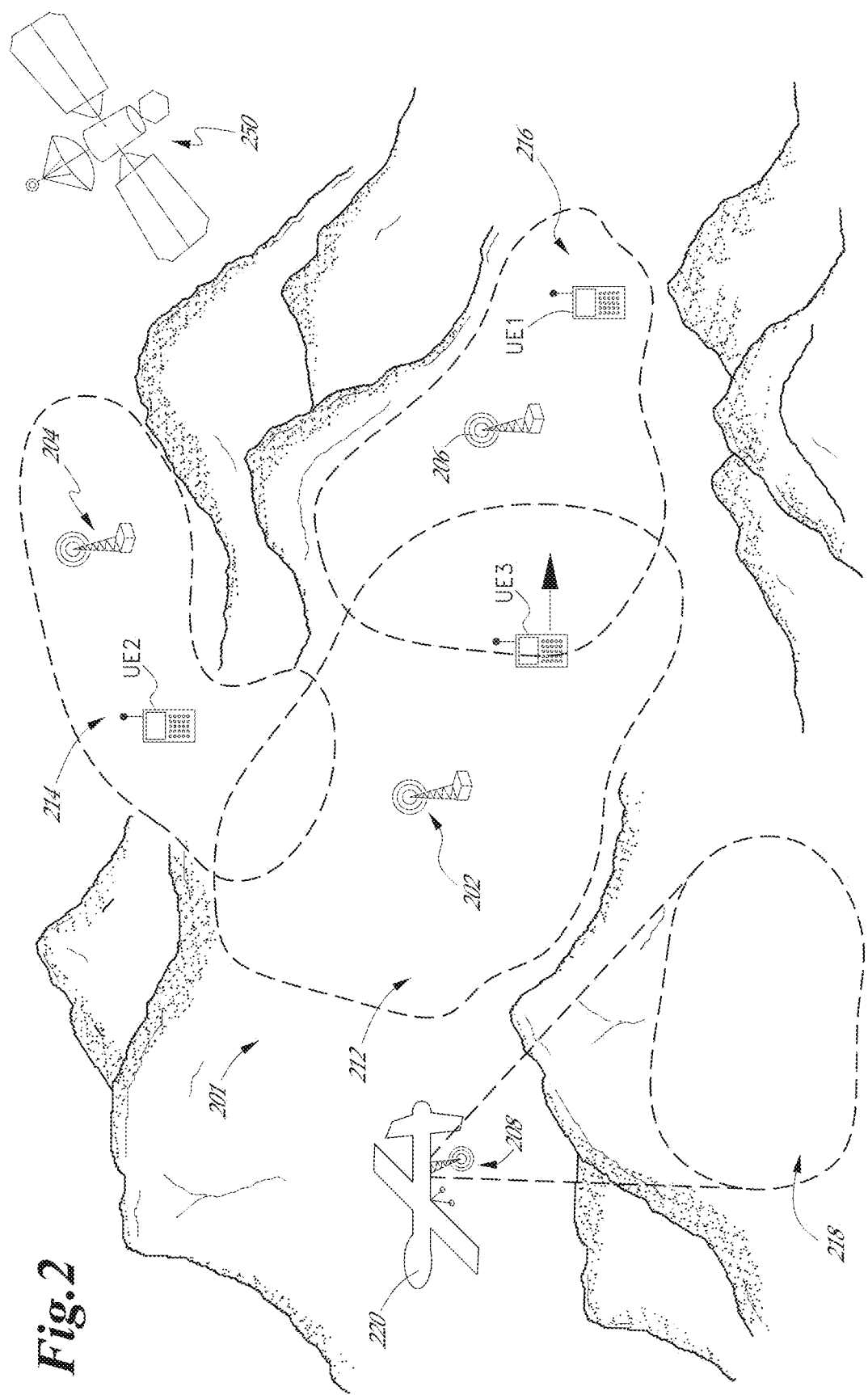
FIG. 2 is a diagram illustrating multiple MCN communication systems and their respective coverage areas.

FIG. 2 is a diagram of an embodiment of multiple MCN communication systems 202, 204, 206, 208 and their corresponding coverage areas 212, 214, 216, and 218, respectively. As described above, and in greater details in U.S. application Ser. Nos. 13/972,112 and 14/264,297, incorporated herein by reference, the MCN communication systems 202, 204, 206, 208, in some embodiments can be networked together to form a NOM.

In the illustrated embodiment, some of the coverage areas 212, 214, 216 are managed by MCN communication systems 202, 204, 206 that are on the ground. However, as illustrated with MCN communication system 208, the MCN communication systems can be located on a moving object, such as an airplane, drone 220, automobile, ship, boat, or other vehicle. As such the coverage areas can move with the MCN communication system. Furthermore, as illustrated, the coverage areas 212, 214, 216 are adjacent to each other, while coverage area 218 is not adjacent to any of the other coverage areas.

The MCN communication systems 202, 204, 206, and 208 can communicate with each other via any one, or any combination, of satellite communication via satellite 205, microwave or radio wave communication, OFDM, WiMAX, LTE backhaul, etc.

The illustrated embodiment of FIG. 2 further includes UE1 located within coverage area 216, UE2 located within coverage area 214, and UE3 located within overlapping coverage areas 212 and 216 and moving towards MCN communication system 206. For purposes of illustration, the local MCN communication system of UE1 and UE2 can be MCN communication systems 206 and 204, respectively. The local MCN communication system for UE3 can be changing from MCN communication system 202 to MCN communication system 206. In addition, for purposes of illustration only, UE3 can have a point of presence (the remote point of presence) associated with any of MCN communication system 202, 204, or 208 (remote MCN communication system).

As described above, the backhaul access component 156 associated with the MCN communication system 206 can determine that the point of presence associated with the UE3 is a remote point of presence (non-limiting example: is not a point of presence associated with the MCN communication system 206). Based at least in part the determination that a remote point of presence is associated with the UE3, the backhaul access component 156 can determine whether to provide a backhaul link to the remote MCN communication system associated with the remote point of presence. As described above, the backhaul access component 156 can use backhaul access criteria, such as but not limited to, a priority level, the connectivity threshold, etc., to determine whether to provide the backhaul link. In the event the backhaul access component 156 determines to provide backhaul access, the backhaul access component 156 can cause the MCN communication system 206 to provide a backhaul communication link to the remote MCN communication system.

However, in the event that the backhaul access component 156 determines not to provide a backhaul link to the remote MCN communication system based at least in part on the backhaul access criteria, the backhaul access component 156 can cause the MCN communication system 206 to provide the UE3 with a local point of presence associated with MCN communication system 206. As part of providing the UE3 with the with the local point of presence, backhaul access component 156 can cause the UE3 to reattach to the network, delete the remote point of presence, and/or discontinue use of the remote point of presence. As mentioned above, by changing its point of presence, the UE3 can lose access to services, applications, and/or servers available via the remote MCN communication system and, retain access to some applications and/or servers over the Internet or other remote networks, and/or gain access to applications and/or servers that are available via the local MCN communication system.

In some embodiments, the backhaul access component 156 can toggle between allowing and disallowing backhaul access and/or backhaul access to the remote MCN communication system. In some cases the backhaul access component 156 can make the change based at least in part on one or more of the backhaul access criteria (non-limiting examples: a change to the priority level or priority threshold or a change to a backhaul connectivity parameter or threshold, etc.).

In some cases, based at least in part on changes to the backhaul or other backhaul access criteria, the backhaul access component 156 can provide a backhaul link for the UE3 back to the remote MCN communication system. For example, when the MCN communication system 206 becomes the local MCN communication system for the UE3, the backhaul may not satisfy a connectivity threshold (non-limiting example: the latency of the backhaul may not satisfy the latency threshold, the speed of the backhaul may not satisfy a speed threshold, etc.). Based at least in part on a determination by the backhaul access component 156 that the backhaul does not satisfy the connectivity threshold, the backhaul access component 156 can provide the UE3 with a local point of presence and disallow access to the remote MCN communication system and/or backhaul.

Later, the backhaul access component 156 can determine that the backhaul satisfies the connectivity threshold and can provide the UE3 with a backhaul link to the remote MCN communication system (or allow the UE3 to use the backhaul for other communications). Accordingly, over time the backhaul access component can allow or disallow backhaul access for the UE3. Similarly, the backhaul access component 156 can use any one or any combination of the backhaul access criteria to determine whether to provide backhaul access.

When allowing the UE3 access to the remote MCN communication system via the backhaul after previously disallowing access, the backhaul access component 156 can cause the UE3 to reattach to the network (and then allow the UE3 to receive a remote point of presence from the remote MCN communication system), delete the local point of presence, and/or use the remote point of presence still stored on the UE3, etc. As mentioned previously, in some cases, the UE3 can store multiple remote points of presence to different MCN communication systems and use the different points of presence depending on the MCN communication system, applications, and/or servers with which the UE3 desires to communicate.

Non-limiting Example Embodiments

Various example embodiments of the disclosure can be described in view of the following clauses:

Flow Diagrams

Figure 3:
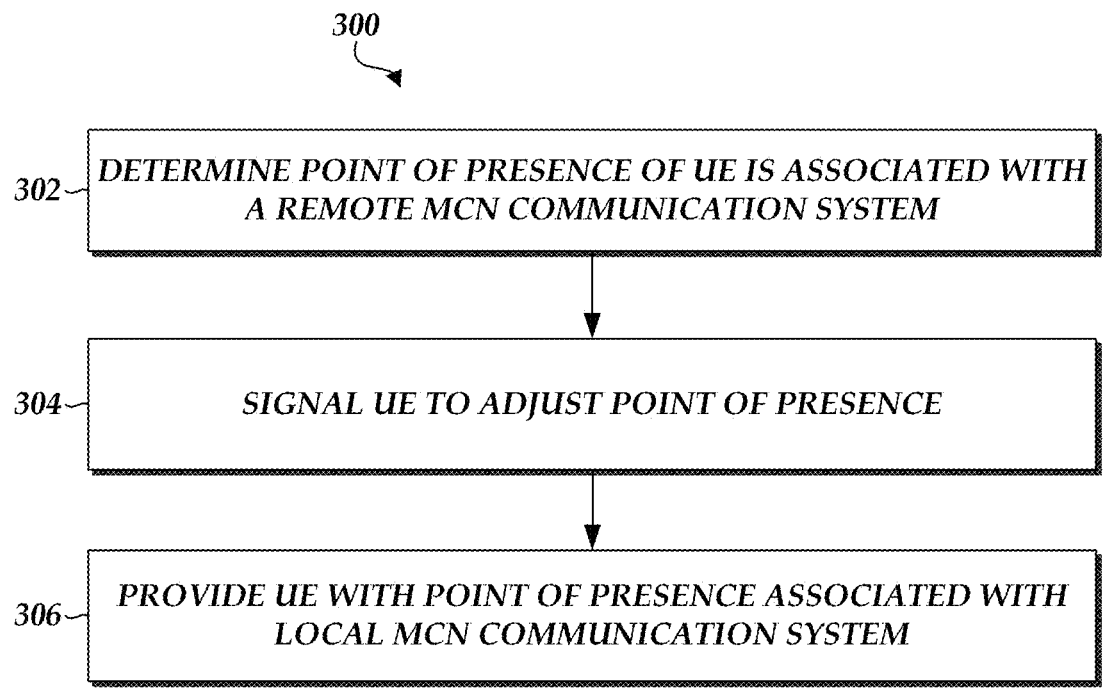
FIG. 3 is a data flow diagram illustrating an embodiment of a routine implemented by a backhaul access component for adjusting a point of presence.

FIG. 3 is a flow diagram illustrative of an embodiment of a routine 300 implemented by a backhaul access component for disallowing access to the backhaul and/or to a remote MCN communication system. One skilled in the relevant art will appreciate that the elements outlined for routine 300 may be implemented by one or many computing devices/components that are associated with the backhaul access component, such as an MCN communication system and/or one of its components, such as the control and data component 152. Accordingly, routine 300 has been logically associated as being generally performed by the backhaul access component, and thus the following illustrative embodiments should not be construed as limiting.

At block 302, the backhaul access component determines that a UE within the coverage area of the local MCN communication system is associated with a remote point of presence associated with a remote MCN communication system. In some embodiments, to determine that the UE is associated with the remote point of presence, the backhaul access component can compare the point of presence of the UE with one or more points of presence associated with the local MCN communication system. For example, if the backhaul access component determines that the point of presence of the UE does not match any of the points of presence associated with the local MCN communication system (or does not fit within a range of points of presence), the backhaul access component can determine that the point of presence of the UE is a remote point of presence. In some cases, the backhaul access component can compare the point of presence of the UE with one or more IP addresses associated with the local MCN communication system, one or more APNs, or other access point identifiers, associated with the local MCN communication system, one or more DNS associated with the MCN communication system, a port identifier associated with the MCN communication system, a max allocated rate for data transmission associated with the MCN communication system, etc.

In certain embodiments, the backhaul access component can determine that the UE is associated with a remote point of presence based at least in part on a handover operation with another MCN communication system. For example, as part of the handover operation, the other MCN communication system can indicate that the UE is associated with a remote point of presence.

In some embodiments, the backhaul access component can determine that the UE is associated with the remote point of presence based at least in part on one or more interactions with the UE, such as a request by the UE for an access point different from the access points associated with the local MCN communication system area and/or a request by the UE for access to a remote MCN communication system, or an application and/or server associated therewith (non-limiting example: an application or server that is only accessible via the remote MCN communication system or an application or server that is not accessible via the local MCN communication system but is accessible via the remote MCN communication system).

At block 304, the backhaul access component causes the local MCN communication system to signal the UE to adjust the remote point of presence. In some embodiments, the signal to the UE can cause the UE to reattach to the network, delete the remote point of presence, and/or discontinue the use of the remote point of presence. For example, when reattaching to the MCN communication system, they UE may flush or remove the remote point of presence and request a new point of presence from the MCN communication system.

In some embodiments, the backhaul access component can cause the local MCN communication system to signal the UE to adjust the remote point of presence based at least in part on one or more backhaul access criteria, such as, but not limited to, a connectivity threshold, priority level threshold, a user identification, etc. For example, based at least in part on a determination by the backhaul access component that one or more of the connectivity threshold and/or the priority level threshold, etc., is not satisfied, the backhaul access component can cause the local MCN communication system to signal the UE to adjust the remote point of presence. Furthermore, in some embodiments, whether the connectivity threshold is satisfied can be determined based at least in part on monitoring the backhaul, as described in greater detail above.

At block 306, the backhaul access component causes the local MCN communication system to provide the UE with a local point of presence associated with the local MCN communication system. In some embodiments, the local MCN communication system provides the local point of presence to the UE. In some embodiments, by providing the UE with the local point of presence, the MCN communication system disallows backhaul access to the remote MCN communication system and/or all backhaul access. In some embodiments, to provide the local point of presence to the UE, a PGW associated with the local MCN communication system assigns an IP address for the UE, which can replace an IP address assigned by a PGW associated with the remote MCN communication system.

In certain embodiments, to provide the local point of presence to the UE, the local MCN communication system provides the UE with the local point of presence irrespective of the APN requested. In some embodiments, the local point of presence and remote point of presence correspond to the same point of presence for the same type of data (non-limiting example: remote point of presence and local point of presence correspond to the point of presence associated with voice data).

Depending on the embodiment, certain acts, events, blocks, or functions of any of the routine 300 can be performed in a different sequence, can be added, merged, or left out altogether (e.g., not all described operations or events are necessary for the practice of the routine 300). Moreover, in certain embodiments, operations or events can be performed concurrently, e.g., through multi-threaded processing, interrupt processing, or multiple processors or processor cores or on other parallel architectures, rather than sequentially. Furthermore, fewer, more, or different blocks can be used in routine 300 as desired. For example, any one or more blocks from routine 400, described below can be used in conjunction with routine 300.

In some embodiments, blocks 304 and 306 can be combined. For example providing the local point of presence to the UE can cause the UE to adjust its point of presence.

Furthermore, in certain embodiments, the backhaul access component can detect the UE within the coverage area of the local MCN communication system and/or can complete a handover operation with another MCN communication system. In some cases, the backhaul access component can monitor the backhaul, and signal the UE to adjust the point of presence based at least in part on monitoring the backhaul and/or a backhaul access criteria.

In some embodiments, after providing the UE with the local point of presence, the backhaul access component can continue to monitor the backhaul and/or other backhaul access criteria and signal the UE to adjust the point of presence based at least in part on the monitoring. As such, the backhaul access component can alter between providing backhaul access and not providing backhaul access. After not providing backhaul access and then providing backhaul access, the UE can receive a remote point of presence from the remote MCN communication system in order to reestablish the connection. In some embodiments, the backhaul access component can cause the local MCN communication system to signal the UE to reattach to the network, delete the local point of presence, and or discontinue its use.

Figure 4:
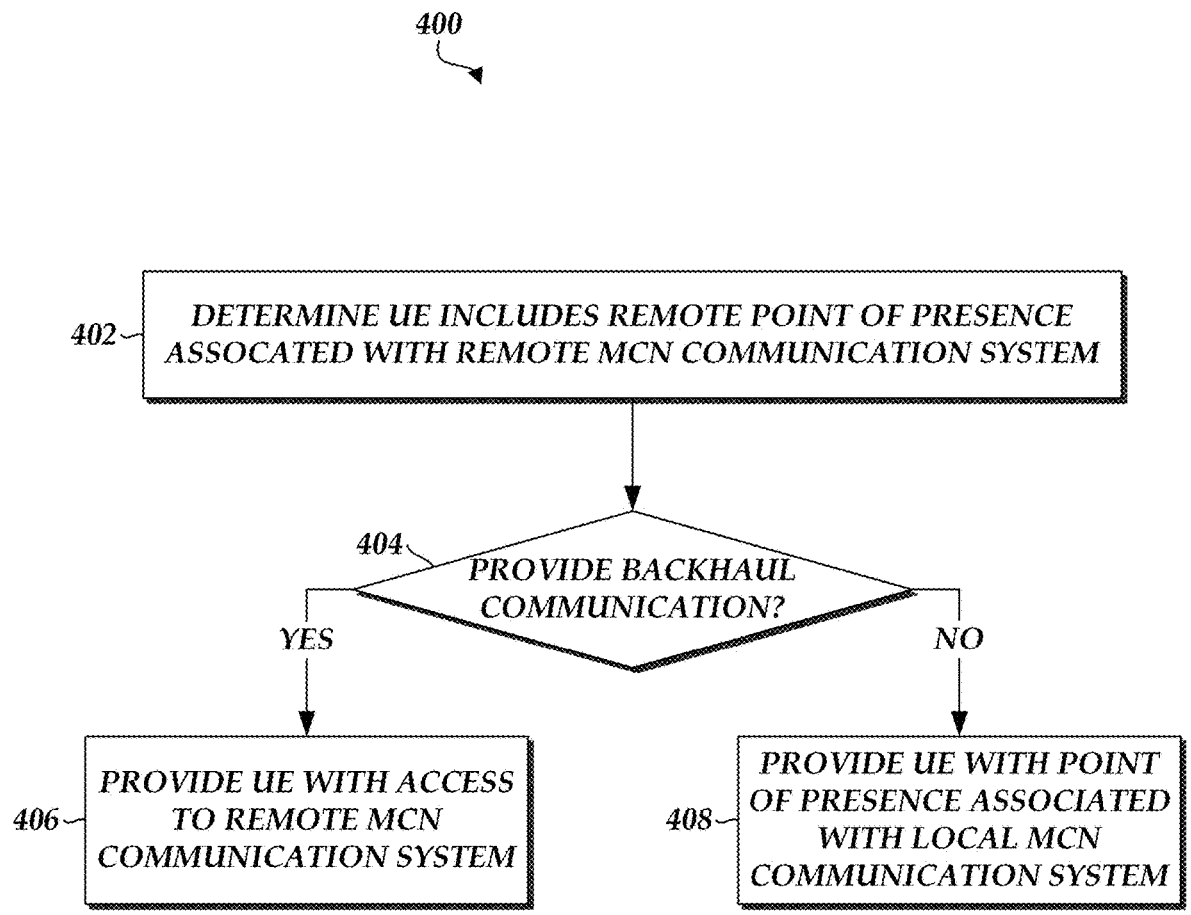
FIG. 4 is a flow diagram illustrative of an embodiment of a routine implemented by a backhaul access component for providing backhaul access.

FIG. 4 is a flow diagram illustrative of an embodiment of a routine 400 implemented by a backhaul access component for providing backhaul communications. One skilled in the relevant art will appreciate that the elements outlined for routine 400 may be implemented by one or many computing devices/components that are associated with the backhaul access component, such as an MCN communication system and/or one of its components, such as the control and data component 152. Accordingly, routine 400 has been logically associated as being generally performed by the backhaul access component, and thus the following illustrative embodiments should not be construed as limiting.

At block 402, the backhaul access component determines that a UE within the coverage area of a local MCN communication system is associated with a remote point of presence associated with a remote MCN communication system. As described previously, the backhaul access component can determine that the UE within the coverage area is associated with the remote point of presence in a variety of ways. For example, the backhaul access component can compare a point of presence of the UE with the number or range of points of presence associated with the local MCN communication system. If there is no match, the backhaul access component can determine that the UE is associated with a remote point of presence. In some embodiments the backhaul access component can determine that the UE is associated with a remote point of presence based at least in part on a handover operation with another MCN communication system, and access point identifier received from the UE, and/or anyone number of other identifiers received by the UE.

At decision block 404, the backhaul access component determines whether to provide backhaul communication to the remote MCN communication system. As described previously, in some embodiments, the backhaul access component can determine whether to provide communication using backhaul access criteria. The backhaul access criteria can include, but is not limited to an analysis of the backhaul, a security or priority level associated with the UE, a user, and/or the data, an event, an identifier associated with a user, etc.

At block 406, based at least on a determination to provide a backhaul communication, the backhaul access component can cause the local MCN communication system to provide a backhaul link to the remote MCN communication system.

As discussed in greater detail above, the determination to provide a backhaul link can be based at least in part on the backhaul access criteria, such as a determination that a connectivity threshold is satisfied, a security or priority level threshold is satisfied, etc.

In providing the UE with access to the remote MCN communication system, the local MCN communication system can, in some embodiments, allow the UE to use the remote point of presence for network traffic. In certain embodiments, data routed to and from the UE can be communicated to the remote MCN communication system via the backhaul. Furthermore, the UE can access applications and/or servers that are available from, and in some cases unique to, the remote MCN communication system.

On the other hand, at block 408, based at least in part on a determination not to provide backhaul access, the backhaul access component can cause the local MCN communication system to provide the UE with a local point of presence associated with the local MCN communication system.

As part of providing the UE with a local point of presence, the backhaul access component can cause the local MCN communication system to signal the UE to reattach, delete the remote point of presence, and/or discontinue use of the remote point of presence. The UE can use the newly received local point of presence for future communication with the local MCN communication system. In addition, the local MCN communication system can provide the UE with access to applications, servers, etc. that may be specific to the local MCN communication system. In some cases, the applications and servers available via a local MCN communication system can be similar to or different from applications, servers, etc. that are available via the remote MCN communication system. In certain embodiments by providing the UE with the local point of presence, the local MCN communication system can prohibit communication with the remote MCN communication system and/or reduce or eliminate UE-related backhaul traffic.

Depending on the embodiment, certain acts, events, blocks, or functions of any of the routine 400 can be performed in a different sequence, can be added, merged, or left out altogether (e.g., not all described operations or events are necessary for the practice of the routine 400). Moreover, in certain embodiments, operations or events can be performed concurrently, e.g., through multi-threaded processing, interrupt processing, or multiple processors or processor cores or on other parallel architectures, rather than sequentially. Furthermore, fewer, more, or different blocks can be used in routine 400 as desired. For example, any one or more blocks from routine 300, described above can be used in conjunction with routine 400. For example, the backhaul access component can cause the local MCN communication to detect the UE within the coverage area and/or cause the MCN communication system to complete the handover operation with another MCN communication system. In some cases, the detection of the UE and/or completion of the handover operation by one MCN communication system can occur due to the movement of another MCN communication system away from the UE.

In some embodiments, the backhaul access component can monitor a backhaul link between the local MCN communication system and the remote MCN communication system. In some embodiments, the backhaul access component can monitor the backhaul link, before, after, or concurrently with, decision block 404, or any other block of routine 400. For example, upon determining that the UE includes a remote point of presence, the backhaul access component can monitor the backhaul to determine whether it satisfies a connectivity threshold. Based at least in part on a determination that the backhaul satisfies the connectivity threshold, the backhaul access component can determine that backhaul communications should be provided, and based at least in part on a determination that the backhaul does not satisfy the connectivity threshold, the backhaul access component can determine that backhaul communications should not be provided.

Furthermore, after providing the UE with a local point of presence and disallowing backhaul link to the remote MCN communication system, the backhaul access component can monitor the backhaul, and based at least in part on the backhaul access criteria, provide the UE with backhaul communications to the remote MCN communication system. For example, the backhaul access component can provide the backhaul communication based at least in part on a change to at least one of the backhaul access criteria, such as, but not limited to, the priority level or priority level threshold, user identifier, or the satisfaction of the connectivity threshold, etc.

In certain embodiments, upon determining that the UE includes a remote point of presence, the backhaul access component can cause the MCN communication system to provide the UE with a local point of presence associated with the local MCN communication system. The backhaul access component can then determine whether or not to provide backhaul communications for the user equipment. For example, in some instances, based at least in part on backup access criteria, the backhaul access component can allow or disallow backhaul communications and/or the UE can use the local point of presence or the remote point of presence for a particular communication. For example, for communications related to applications and/or services that are unique to the remote MCN communication system, backhaul communications can be provided and/or the UE can use the remote point of presence. For communications related to other applications and/or services, backhaul communications may be disallowed and/or the UE can use the local point of presence.

Non-limiting Example Embodiments

Various example embodiments of the disclosure can be described in view of the following clauses:

Clause 1. A method for altering a point of presence of a user equipment, the method comprising:

detecting at a first mobile cellular network ("MCN") communication system a user equipment ("UE") within a first covered area, wherein the first MCN communication system independently provides a first MCN within the first covered area;

completing a handover routine with a second MCN communication system such that the UE establishes a first cellular communication link with the first MCN communication system and terminates a second cellular communication link with the second MCN communication system, wherein the second MCN communication system independently provides a second MCN within a second covered area;

determining at the first MCN communication system that the UE includes a first point of presence associated with a remote MCN communication system other than the first MCN communication system;

monitoring a backhaul communication channel between the first MCN communication system and the remote MCN communication system;

based at least in part on a determination that the backhaul communication channel between the first MCN communication system and the remote MCN communication system does not satisfy a connectivity threshold, signaling the UE to adjust the first point of presence, and providing the UE with a second point of presence associated with the first MCN communication system; and based at least in part on a determination that the backhaul communication channel between the first MCN communication system and the remote MCN communication system satisfies the connectivity threshold, enabling the UE to communicate with the second MCN communication system via the backhaul communication channel.

Clause 2. The method of Clause 1, wherein the point of presence comprises at least one of an IP address, a DNS identifier, or an access point identifier.

Clause 3. The method of Clause 1, wherein the first MCN communication system comprises:
a first radio access component configured to receive first wireless communications from the user equipment,
a first control and data component in communication with the first radio access component and configured to process the first wireless communications, and
a first data store comprising authentication data of the user equipment.

Clause 4. The method of Clause 1, wherein said monitoring the backhaul communication comprises communicating query packets from the first MCN communication system to the remote MCN communication system.

Clause 5. A method for altering a point of presence of a user equipment, the method comprising:
determining at a backhaul access component that a user equipment ("UE") located within a first covered area associated with a first mobile cellular network ("MCN") communication system comprises a second point of presence associated with a second MCN communication system, wherein the first MCN communication system independently provides a first MCN within the first covered area and the second MCN communication system independently provides a second MCN within a second covered area;
based at least in part on said determining, signaling the UE to adjust the second point of presence; and
causing the first MCN communication system to provide the UE with a first point of presence associated with the first MCN communication system.

Clause 6. The method of Clause 5, wherein said signaling the UE to adjust the second point of presence comprises instructing the UE to reattach.

Clause 7. The method of Clause 5, further comprising determining that a priority level of at least one of the UE, a user of the UE, or data generated by the UE does not satisfy a priority threshold, and wherein said signaling is further based at least in part on said determining that the priority level does not satisfy the priority threshold.

Clause 8. The method of Clause 5, further comprising determining that a backhaul link between the first MCN communication system and the second MCN communication system does not satisfy a connectivity threshold, and wherein said signaling is further based at least in part on said determining that the backhaul link between the first MCN communication system and the second MCN communication system does not satisfy the connectivity threshold.

Clause 9. The method of Clause 8, wherein the connectivity threshold comprises at least one of a bandwidth threshold, a latency threshold, an error rate threshold, a bit rate threshold, or a throughput threshold.

Clause 10. The method of Clause 8, further comprising based at least in part on a determination that the backhaul link between the first MCN communication system and the second MCN communication system satisfies the connectivity threshold and that the UE includes the first point of presence, signaling the UE to adjust the first point of presence, wherein the second MCN communication system provides the UE with a third point of presence associated with the second MCN communication system.

Clause 11. The method of Clause 10, wherein the third point of presence matches the first point of presence.

Clause 12. A system for determining backhaul access, the system comprising one or more processors configured to:
determine that a user equipment ("UE") located within a first covered area associated with a first mobile cellular network ("MCN") communication system comprises a first point of presence associated with a second MCN communication system, wherein the first MCN communication system independently provides a first MCN within the first covered area and the second MCN communication system independently provides a second MCN within a second covered area; and
based at least in part on one or more backhaul access criteria, cause the first MCN communication system to provide the UE with a second point of presence associated with the first MCN communication system.

Clause 13. The system of Clause 12, wherein the backhaul access criteria indicates that all UE within the first covered area are to receive a point of presence associated with the first MCN communication system.

Clause 14. The system of Clause 12, wherein the backhaul access criteria comprises a connectivity threshold, and wherein the one or more processors are configured to cause the cause the first MCN communication system to provide the UE with the second point of presence based at least in part on a determination that a backhaul link between the first MCN communication system and the second MCN communication system does not satisfy the connectivity threshold.

Clause 15. The system of Clause 12, wherein the backhaul access criteria comprises a priority level threshold, and wherein the one or more processors are configured to cause the cause the first MCN communication system to provide the UE with the second point of presence based at least in part on a determination that a priority level associated with the UE does not satisfy the priority level threshold.

Clause 16. The system of Clause 12, wherein the backhaul access criteria comprises a connectivity threshold and a priority level threshold and wherein the one or more processors are configured to cause the cause the first MCN communication system to provide the UE with the second point of presence based at least in part on a determination that at least one of a priority level associated with the UE does not satisfy the priority level threshold or a backhaul link between the first MCN communication system and the second MCN communication system does not satisfy the connectivity threshold.

Clause 17. A first mobile cellular network (MCN) communication system located within a first covered area and configured to generate a first MCN for the first covered area and provide first communication links to one or more first user equipment within the first covered area, the first MCN communication system comprising:
  a first radio access component configured to receive first wireless communications from the one or more first user equipment;
  a first control and data component in communication with the first radio access component and configured to process the first wireless communications; and
  a first data store comprising authentication data of the one or more first user equipment within the first covered area,
  wherein the first MCN communication system independently provides the first MCN for the one or more first user equipment in the first covered area, and wherein the first MCN communication system is configured to:
  detect a user equipment of the one or more first user equipment that includes a first point of presence associated with a second MCN communication system other than the first MCN communication system, and
  based at least in part on one or more backhaul access criteria, provide the UE with a second point of presence associated with the first MCN communication system.

Clause 18. The MCN communication system of Clause 17, wherein the backhaul access criteria indicates that all UE within the first covered area are to receive a point of presence associated with the first MCN communication system.

Clause 19. The MCN communication system of Clause 17, wherein the backhaul access criteria comprises a connectivity threshold, and wherein the first MCN communication system is further configured to provide the UE with the second point of presence based at least in part on a determination that a backhaul link between the first MCN communication system and the second MCN communication system does not satisfy the connectivity threshold.

Clause 20. The MCN communication system of Clause 17, wherein the backhaul access criteria comprises a priority level threshold, and wherein the first MCN communication system is further configured to provide the UE with the second point of presence based at least in part on a determination that a priority level associated with the UE does not satisfy the priority level threshold.

Clause 21. The MCN communication system of Clause 17, wherein the backhaul access criteria comprises a connectivity threshold and a priority level threshold and wherein the first MCN communication system is further configured to provide the UE with the second point of presence based at least in part on a determination that at least one of a priority level associated with the UE does not satisfy the priority level threshold or a backhaul link between the first MCN communication system and the second MCN communication system does not satisfy the connectivity threshold.

Clause 22. A method for maintaining a point of presence of a user equipment, the method comprising:
  detecting at a first mobile cellular network ("MCN") communication system a user equipment ("UE") within a first covered area, wherein the first MCN communication system independently provides a first MCN within the first covered area;
  determining at the first MCN communication system that the UE includes a first point of presence associated with a second MCN communication system other than the first MCN communication system; and
  based at least in part on one or more backhaul access criteria, enabling the UE to communicate with the second MCN communication system via a backhaul communication channel.

Clause 23. The method of Clause 22, wherein the backhaul access criteria comprises a connectivity threshold, the method further comprising determining that a backhaul link between the first MCN communication system and the second MCN communication system satisfies the connectivity threshold, wherein said enabling is based at least in part on said determining that the backhaul link satisfies the connectivity threshold.

Clause 24. The method of Clause 22, wherein the backhaul access criteria comprises a priority level threshold, the method further comprising deter, determining a priority level associated with the UE satisfies the priority level threshold, wherein said enabling is based at least in part on said determining that the priority level satisfies the priority level threshold.

Clause 25. The method of Clause 22, wherein the backhaul access criteria comprises a connectivity threshold and a priority level threshold, the method further comprising:
  determining that a backhaul link between the first MCN communication system and the second MCN communication system satisfies the connectivity threshold; and
  determining a priority level associated with the UE satisfies the priority level threshold,
  wherein said enabling is based at least in part on said determining that the backhaul link satisfies the connectivity threshold and said determining that the priority level satisfies the priority level threshold.

Terminology

Although generally described above as being related to MCN communication systems, it will be understood that the backhaul access component can be implemented as a stand-alone device and can communicate with an MCN communication system and/or a component of a network to control access to the backhaul. For example, the backhaul access component can be configured to communicate with a base station or a core component of a cellular network, such as, but not limited to, a component of the evolved packet core (EPC) of a long-term evolution (LTE) system, etc., or other type of wireless network. In such embodiments, the backhaul access component can cause the corresponding component to perform some or all of the functions described herein with respect to the MCN communication system.

Conditional language, such as, among others, "can," "could," "might," or "may," unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof means any connection or coupling, either direct or indirect, between two or more elements; the coupling or connection between the elements can be physical, logical, or a combination thereof. Additionally, the words "herein," "above," "below," and words of similar import, when used in this application, refer to this application as a whole and not to any particular portions of this application. Where the context permits, words in the above Detailed Description using the singular or plural number may also include the plural or singular number respectively. The word "or" in reference to a list of two or more items, covers all of the following interpretations of the word: any one of the items in the list, all of the items in the list, and any combination of the items in the list. Likewise the term "and/or" in reference to a list of two or more items, covers all of the following interpretations of the word: any one of the items in the list, all of the items in the list, and any combination of the items in the list.

Depending on the embodiment, certain operations, acts, events, or functions of any of the algorithms described herein can be performed in a different sequence, can be added, merged, or left out altogether (e.g., not all are necessary for the practice of the algorithms). Moreover, in certain embodiments, operations, acts, functions, or events can be performed concurrently, e.g., through multi-threaded processing, interrupt processing, or multiple processors or processor cores or on other parallel architectures, rather than sequentially.

The various illustrative logical blocks, modules, routines, and algorithm steps described in connection with the embodiments disclosed herein can be implemented as electronic hardware, or as a combination of electronic hardware and executable software. To clearly illustrate this interchangeability, various illustrative components, blocks, modules, and steps have been described above generally in terms of their functionality. Whether such functionality is implemented as hardware, or as software that runs on hardware, depends upon the particular application and design constraints imposed on the overall system. The described functionality can be implemented in varying ways for each particular application, but such implementation decisions should not be interpreted as causing a departure from the scope of the disclosure.

Moreover, the various illustrative logical blocks and modules described in connection with the embodiments disclosed herein can be implemented or performed by a machine, such as a processor device, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor device can be a microprocessor, but in the alternative, the processor device can be a controller, microcontroller, or combinations of the same, or the like. A processor device can include electrical circuitry configured to process computer-executable instructions. In another embodiment, a processor device includes an FPGA or other programmable device that performs logic operations without processing computer-executable instructions. A processor device can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor device may also include primarily analog components. For example, some or all of the signal processing algorithms described herein may be implemented in analog circuitry or mixed analog and digital circuitry. A computing environment can include any type of computer system, including, but not limited to, a computer system based on a microprocessor, a mainframe computer, a digital signal processor, a portable computing device, a device controller, or a computational engine within an appliance, to name a few.

The elements of a method, process, routine, or algorithm described in connection with the embodiments disclosed herein can be embodied directly in hardware, in a software module executed by a processor device, or in a combination of the two. A software module can reside in RAM memory, flash memory, ROM memory, EPROM memory, EEPROM memory, registers, hard disk, a removable disk, a CD-ROM, or any other form of a non-transitory computer-readable storage medium. An exemplary storage medium can be coupled to the processor device such that the processor device can read information from, and write information to, the storage medium. In the alternative, the storage medium can be integral to the processor device. The processor device and the storage medium can reside in an ASIC. The ASIC can reside in a user terminal. In the alternative, the processor device and the storage medium can reside as discrete components in a user terminal.

Further, the processing of the various components of the illustrated systems can be distributed across multiple machines, networks, and other computing resources. In addition, two or more components of a system can be combined into fewer components. Various components of the illustrated systems can be implemented in one or more virtual machines, rather than in dedicated computer hardware systems and/or computing devices.

Any patents and applications and other references noted above, including any that may be listed in accompanying filing papers, are incorporated herein by reference. Aspects of the invention can be modified, if necessary, to employ the systems, functions, and concepts of the various references described above to provide yet further implementations of the invention.

These and other changes can be made to the invention in light of the above Detailed Description. While the above description describes certain examples of the invention, and describes the best mode contemplated, no matter how detailed the above appears in text, the invention can be practiced in many ways. Details of the system may vary considerably in its specific implementation, while still being encompassed by the invention disclosed herein. As noted above, particular terminology used when describing certain features or aspects of the invention should not be taken to imply that the terminology is being redefined herein to be restricted to any specific characteristics, features, or aspects of the invention with which that terminology is associated. In general, the terms used in the following claims should not be construed to limit the invention to the specific examples disclosed in the specification, unless the above Detailed Description section explicitly defines such terms. Accordingly, the actual scope of the invention encompasses not only the disclosed examples, but also all equivalent ways of practicing or implementing the invention under the claims.

To reduce the number of claims, certain aspects of the invention are presented below in certain claim forms, but the applicant contemplates the various aspects of the invention in any number of claim forms. For example, while only one aspect of the invention may be recited as a means-plus-function claim under 35 U.S.C sec. 112(f) (AIA), other aspects may likewise be embodied as a means-plus-function claim, or in other forms, such as being embodied in a computer-readable medium. Any claims intended to be treated under 35 U.S.C. § 112(f) will begin with the words "means for", but use of the term "for" in any other context is not intended to invoke treatment under 35 U.S.C. § 112(f). Accordingly, the applicant reserves the right to pursue additional claims after filing this application, in either this application or in a continuing application.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

While the above detailed description has shown, described, and pointed out novel features as applied to various embodiments, it can be understood that various omissions, substitutions, and changes in the form and details of the devices or algorithms illustrated can be made without departing from the spirit of the disclosure. As can be recognized, certain embodiments described herein can be embodied within a form that does not provide all of the features and benefits set forth herein, as some features can be used or practiced separately from others. The scope of certain embodiments disclosed herein is indicated by the appended claims rather than by the foregoing description. All changes which come within the meaning and range of equivalency of the claims are to be embraced within their scope.

What is claimed is:

1. A method for altering a point of presence of a user equipment ("UE"), the method comprising:
   determining at a backhaul access component that a UE located within a first covered area associated with a first portable cellular network communication system comprises a second point of presence associated with a second portable cellular network communication system, wherein the first portable cellular network communication system independently provides a first cellular network within the first covered area and the second portable cellular network communication system independently provides a second cellular network within a second covered area;
   monitoring a backhaul link between the first portable cellular network communication system and the second portable cellular network communication system; and
   based at least in part on a determination that the backhaul link between the first portable cellular network communication system and the second portable cellular network communication system does not satisfy a connectivity threshold:
      signaling the UE to adjust the second point of presence, and
      causing the first portable cellular network communication system to provide the UE with a first point of presence associated with the first portable cellular network communication system.

2. The method of claim 1, wherein said monitoring the backhaul link comprises communicating query packets from the second portable cellular network communication system to the first portable cellular network communication system.

3. The method of claim 1, wherein at least one of the first point of presence or the second point of presence comprises at least one of an IP address, a DNS identifier, or an access point identifier.

4. The method of claim 1, wherein the backhaul link comprises a wireless backhaul communication channel.

5. The method of claim 1, wherein said signaling the UE to adjust the second point of presence comprises instructing the UE to reattach.

6. The method of claim 1, further comprising determining that a priority level of at least one of the UE, a user of the UE, or data generated by the UE does not satisfy a priority threshold, and wherein said signaling the UE to adjust the second point of presence is based at least in part on said determining that the priority level does not satisfy the priority threshold.

7. The method of claim 1, wherein the connectivity threshold comprises at least one of a bandwidth threshold, a latency threshold, an error rate threshold, a bit rate threshold, or a throughput threshold.

8. The method of claim 1, further comprising based at least in part on a determination that the backhaul link between the first portable cellular network communication system and the second portable cellular network communication system satisfies the connectivity threshold and that the UE includes the first point of presence, signaling the UE to adjust the first point of presence, wherein the second portable cellular network communication system provides the UE with a third point of presence associated with the second portable cellular network communication system.

9. The method of claim 8, wherein the third point of presence matches the second point of presence.

10. The method of claim 1, wherein the first portable cellular network communication system comprises:
   an antenna configured to receive wireless communications from the UE;
   one or more processors in communication with the antenna and configured to process the wireless communications; and
   a data store comprising authentication data of the UE.

11. A system for determining backhaul access, the system comprising one or more processors configured to:
   determine that a user equipment ("UE") located within a first covered area associated with a first portable cellular network communication system comprises a first point of presence associated with a second portable cellular network communication system, wherein the first portable cellular network communication system independently provides a first movable cellular network within the first covered area and the second portable cellular network communication system independently provides a second movable cellular network within a second covered area; and based at least in part on one or more backhaul access criteria associated with a backhaul link between the first portable cellular network communication system and the second portable cellular network communication system, cause the first portable cellular network communication system to provide the UE with a second point of presence associated with the first portable cellular network communication system.

12. The system of claim 11, wherein the backhaul access criteria indicates that all UE within the first covered area are to receive a point of presence associated with the first portable cellular network communication system.

13. The system of claim 11, wherein to cause the first portable cellular network communication system to provide the UE with the second point of presence is further based at least in part on a determination that the backhaul link does not satisfy a connectivity threshold.

14. The system of claim 11, wherein to cause the first portable cellular network communication system to provide the UE with the second point of presence is further based at least in part on a determination that a priority level associated with the UE does not satisfy a priority level threshold.

15. The system of claim 11, wherein the backhaul access criteria comprises a connectivity threshold and a priority level threshold, and wherein to cause the first portable cellular network communication system to provide the UE with the second point of presence is further based at least in part on a determination that at least one of a priority level associated with the UE does not satisfy the priority level threshold or the backhaul link does not satisfy the connectivity threshold.

16. A first portable cellular network communication system located within a first covered area and configured to generate a first movable cellular network for the first covered area and provide first communication links to one or more first user equipment ("UE") within the first covered area, the first portable cellular network communication system comprising:

a first antenna configured to receive first wireless communications from one or more first UE;

one or more processors in communication with the first antenna and configured to process the first wireless communications; and a first data store comprising authentication data of the one or more first UE within the first covered area, wherein the first portable cellular network communication system independently provides the first movable cellular network for the one or more first UE in the first covered area, and wherein the first portable cellular network communication system is configured to:

detect a UE of the one or more first UE that includes a first point of presence associated with a second portable cellular network communication system other than the first portable cellular network communication system, and based at least in part on one or more backhaul access criteria associated with a backhaul link between the first portable cellular network communication system and the second portable cellular network communication system, provide the UE with a second point of presence associated with the first portable cellular network communication system.

17. The first portable cellular network communication system of claim 16, wherein the backhaul access criteria indicates that all UE within the first covered area are to receive a point of presence associated with the first portable cellular network communication system.

18. The first portable cellular network communication system of claim 16, wherein the backhaul access criteria comprises a connectivity threshold, and wherein to provide the UE with the second point of presence is further based at least in part on a determination that the backhaul link between the first portable cellular network communication system and the second portable cellular network communication system does not satisfy the connectivity threshold.

19. The first portable cellular network communication system of claim 16, wherein the backhaul access criteria comprises a priority level threshold, and wherein to provide the UE with the second point of presence is further based at least in part on a determination that a priority level associated with the UE does not satisfy the priority level threshold.

* * * * *